R. P. ANDERSON.
FUEL ATTACHMENT.
APPLICATION FILED AUG. 1, 1921.
1,403,998.
Patented Jan. 17, 1922.
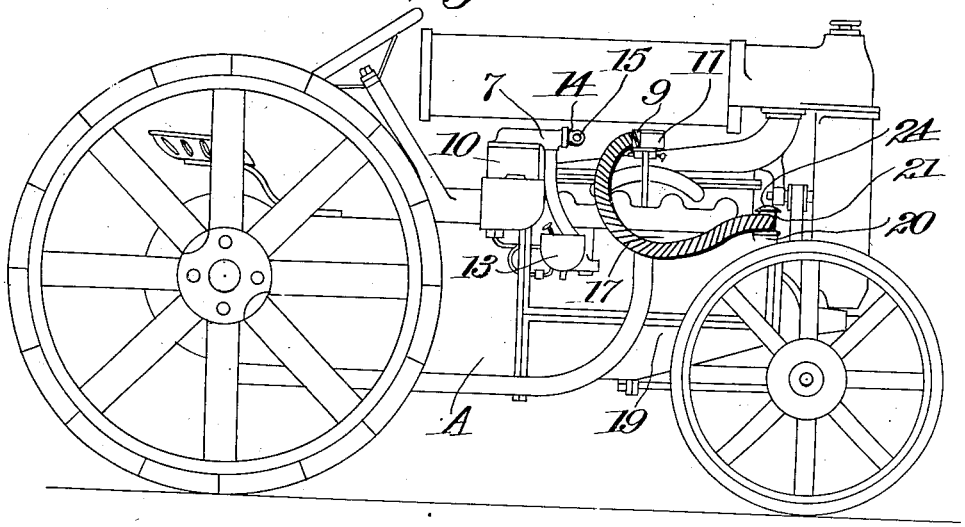
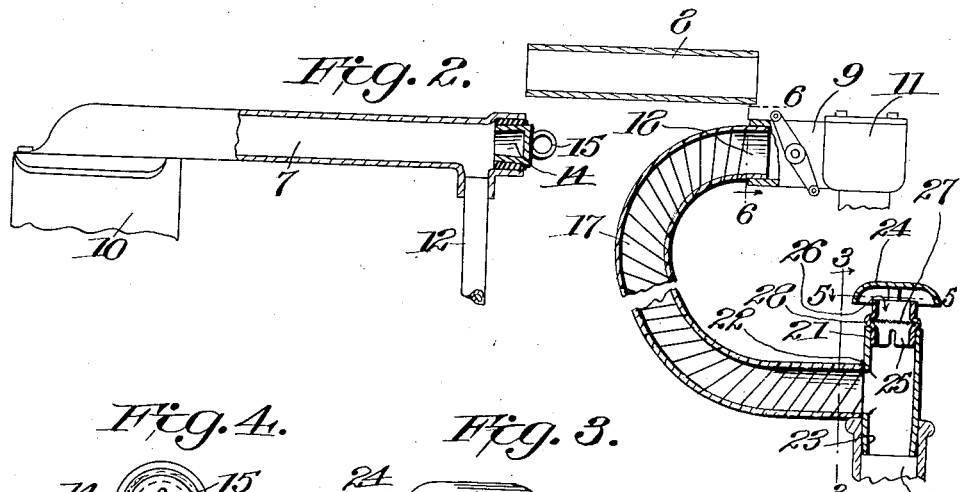
Inventor,
Rual Percell Anderson,
By M. Jones
Attorney.

UNITED STATES PATENT OFFICE.

RUAL PURCELL ANDERSON, OF GORE, VIRGINIA.

FUEL ATTACHMENT.

1,403,998. Specification of Letters Patent. Patented Jan. 17, 1922.

Application filed August 1, 1921. Serial No. 489,033.

*To all whom it may concern:*

Be it known that I, RUAL PURCELL ANDERSON, a citizen of the United States, residing at Gore, in the county of Frederick and State of Virginia, have invented a new and useful Fuel Attachment, of which the following is a specification.

This invention relates to an attachment for motor vehicles, particularly tractors to utilize lubricant vapors from the crank case of the engine in the fuel of the engine.

I have found that the vapors arising from lubricant within the engine crank case, which are now wasted or lost through the breather pipe, may be utilized in the engine fuel and that it increases the power of the engine, reduces the amount of kerosene, gasoline or other motive fuel usually employed, at a consequent reduction in operating expense.

A prime object therefore is to provide a means to convey oil vapors from the crank case as to the fuel supply pipe of the carbureter and to dispose said means in the line of suction of the engine during the intake strokes of its pistons.

Another object is to provide a construction to cooperate with a fuel system having a main air supply tube leading to a mixing chamber and provided with a removable section and an air tube leading from said tube to a fuel float chamber, in that said section may be removed and a plug substituted adjacent the second mentioned air tube and a conduit attached to the main air tube adjacent the mixing chamber and disposed in communication with the crank case.

Still another object is to provide a conduit leading to the fuel line of the engine and having a nozzle attachable to the breather pipe of the engine and a removable breather cap on said nozzle.

Additional objects and advantages will appear from the description of one operative embodiment as illustarted in accompanying drawings and hereinafter following.

In said drawings:—

Figure 1 is a front elevation of a tractor having my attachment applied thereto;

Figure 2 is a view principally in section, showing my improvements and the connection thereof in the fuel assembly of the engine of the tractor;

Figure 3 is a view on the line 3—3 of Figure 2;

Figure 4 is an end elevation showing portions of the air tubes and the plug employed to close them;

Figure 5 is a cross section on the line 5—5 of Figure 2 and

Figure 6 is a cross section on the line 6—6 of Figure 2.

Referring specifically to the drawings wherein like reference characters designate like or similar parts, a tractor is conventionally shown at A. The improvements particularly cooperate with the main air supply tube which comprises sections 7, 8 and 9, which in actual practice are connected in communication, but with the section 8 removable from sections 7 and 9 as suggested in Figure 2 of the drawings. Said main air supply tube leads from an air washer 10 to a chamber 11 for admixture of air and gas which is located in the carbureting system. Leading from section 7 is a primary air tube 12 communicating with a fuel float chamber 13, operatively associated in the carbureting system to supply fuel to the mixing chamber 11. The parts described are the usual construction as associated with the propelling engine of the tractor, which is of the internal combustion type.

In utilizing my invention, the section 8 is removed from the main air feed line, thus interrupting communication between the pipes 7 and 9 directly. Opposite pipe 12, a plug 14, of any suitable construction, is removably insertible into the exposed end of pipe 7. As shown, this plug may have a handle 15, and a gasket 16 for hermetic engagement with the inner wall of pipe or tube 7.

A suitable conduit 17 at an end 18 is removably disposed within the tube section 9 in frictional contact with the interior wall of said tube. Conduit 17 may be made of any suitable material, for instance flexible metallic hose or tubing as shown. The opposite end of conduit 17 is disposed in communication with the crank case 19 of the engine, preferably at the breather pipe 20. To this end, a nozzle 21 is soldered or otherwise secured at 22 to the conduit 17. Nozzle 21 extends below the conduit 17 and is preferably tapered at 23 to provide an attaching nipple for removable insertion into breather pipe 20 and frictional engagement with the contacting wall thereof. Nozzle 21 also extends above the point of attachment of conduit 17 thereto to permit "breathing"

of the engine and a breather cap 24 may be removably disposed therein by means of a split tube 25, frictionally engaging the inner wall thereof. Air may pass through the cap in the direction indicated by the arrow 26. Such air is preferably drawn through metallic or other gauze 27 fastened in place by clinching as at 28 which provides a rib at this point to limit the extension of tube 25 into nozzle 21.

It may be mentioned that the breather cap 24 is of a size to permit selective use in the pipe 20 direct or in the nozzle 21, to be thus capable of use on pipe 20 whether or not my improvement is used.

With the parts attached as shown, during operation of the engine, a suction is created through the breather pipe 20 which conveys lubricant vapors from the crank case 19 through conduit 17 and tube section 9 into the mixing chamber 11 for admixture with fuel and air passing from the chamber 13 thereinto. When the attachment is in operation, the utilization of the lubricant vapors enables operation of the tractor with more power and at less fuel consumption than is now required and at a considerable saving in the operating expense.

The attachment is readily detachable from or applicable to the engine, as will be realized, dependent on the removal and replacement of the conduit and nozzle, the plug 14 and the air tube section 8.

Changes within the spirit and scope may be resorted to.

I claim:—

1. The combination with a conduit of an internal combustion engine in which a suction occurs during operation and which is interrupted to provide a gap intermediate the ends of said conduit, of a closure means for one end of the conduit at said gap, and a conduit in communication with the other end of the first mentioned conduit at the gap and with the crank case.

2. The combination with an internal combustion engine having an air supply tube leading to a fuel mixing chamber and an air supply tube leading from said tube to a fuel control chamber in operative relation to said mixing chamber, of a section removable from the first air tube intermediate the mixing chamber and junction with the second air tube, a closure for one end of said first air tube adjacent the second air tube in place of said section, and a conduit in communication with said first air tube adjacent the mixing chamber in place of said section and also in communication with the crank case to convey lubricant vapors therefrom.

3. The combination in an internal combustion engine, of a mixing chamber for fuel and air, a fuel control chamber in communication with said chamber, an air supply means in communication with said mixing chamber and said control chamber, means to cut off communication between said air supply means and mixing chamber independent of the communication of said air supply means and control chamber whereby operation of the second means will not choke the supply of fuel to the engine, and auxiliary fuel supply means in the line of suction of the engine in communication with said mixing chamber and out of operative communication with said air supply means.

4. The combination in an internal combustion engine, of an air supply tube, a mixing chamber to which said tube leads, a fuel control chamber, an air supply tube leading from the first air supply tube to the control chamber, a detachable section in the first tube between the mixing chamber and second tube, means to close one end of the first tube exposed by detachment of said section, and a supplemental fuel supply means attachable in communication with the other end of the first tube exposed by detachment of said section.

Signed at Gore, in the county of Frederick and State of Virginia this 28th day of July, 1921.

RUAL PURCELL ANDERSON.